United States Patent
Munshi et al.

(10) Patent No.: US 9,186,757 B2
(45) Date of Patent: Nov. 17, 2015

(54) METHOD OF PROVIDING A TURBINE BLADE TIP REPAIR

(75) Inventors: Mrinal Munshi, Orlando, FL (US); Ching-Pang Lee, Cincinnati, OH (US); Benjamin P. Swanson, Orlando, FL (US); Petya M. Georgieva, Oviedo, FL (US); James A. Morin, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 68 days.

(21) Appl. No.: 13/467,298

(22) Filed: May 9, 2012

(65) Prior Publication Data

US 2013/0298400 A1 Nov. 14, 2013

(51) Int. Cl.

| B23P 6/00 | (2006.01) |
|---|---|
| B23P 19/04 | (2006.01) |
| B23K 9/04 | (2006.01) |
| F01D 5/00 | (2006.01) |
| F01D 5/18 | (2006.01) |
| F01D 5/20 | (2006.01) |
| F01D 11/14 | (2006.01) |

(52) U.S. Cl.
CPC .............. B23P 6/002 (2013.01); F01D 5/005 (2013.01); F01D 5/18 (2013.01); F01D 5/186 (2013.01); F01D 5/187 (2013.01); F01D 5/20 (2013.01); F01D 11/14 (2013.01); *Y10T 29/49318* (2015.01)

(58) Field of Classification Search
CPC ......... B23P 6/002; F01D 5/187; F01D 5/005; F01D 5/18; F01D 5/186; F01D 11/14; F01D 5/20; Y10T 29/49318
USPC ............. 29/889.1, 402.01, 402.05, 402.06, 29/402.07, 402.09, 402.11, 402.18
See application file for complete search history.

(56) References Cited

U.S. PATENT DOCUMENTS

| 3,899,267 | A |   | 8/1975 | Dennis et al. |
|---|---|---|---|---|
| 3,973,874 | A | * | 8/1976 | Corsmeier et al. .......... 416/97 A |
| 4,073,599 | A |   | 2/1978 | Allen et al. |
| 4,141,127 | A | * | 2/1979 | Cretella et al. .............. 29/889.1 |
| 4,214,355 | A | * | 7/1980 | Zelahy .......................... 29/889.1 |
| 4,390,320 | A | * | 6/1983 | Eiswerth ..................... 416/97 R |
| 4,509,571 | A | * | 4/1985 | Peters ............................ 144/2.1 |
| 4,519,745 | A | * | 5/1985 | Rosman et al. ............. 416/96 A |
| 5,374,319 | A | * | 12/1994 | Stueber et al. ................ 148/404 |
| 5,409,415 | A | * | 4/1995 | Kawanami et al. ............. 451/39 |
| 5,509,980 | A |   | 4/1996 | Lim |
| 5,738,491 | A | * | 4/1998 | Lee et al. ...................... 415/177 |

(Continued)

FOREIGN PATENT DOCUMENTS

| CN | 101333941 A | 12/2008 |
|---|---|---|
| CN | 102275058 A | 12/2011 |
| WO | WO0151772 A1 | 7/2001 |

*Primary Examiner* — David Bryant
*Assistant Examiner* — Darrell C Ford (57) ABSTRACT

A method of repairing a turbine blade having a radially extending outer wall defining an internal cavity width and a blade tip. The method comprises removing at least a portion of the blade tip to form a repair surface and providing a tip cap having a radially outer side with an outer width that may be less than the internal cavity width, and having a radially inner side with an inner width that is substantially equal to or greater than the internal cavity width. The tip cap is positioned at the repair surface, and the tip cap is welded to the repair surface using a ductile welding material. A cap peripheral portion is formed by build-up welding around the tip cap, and a squealer portion is formed by build-up welding on the cap peripheral portion.

20 Claims, 5 Drawing Sheets

(56) References Cited

U.S. PATENT DOCUMENTS

| | | | |
|---|---|---|---|
| 5,822,852 A | 10/1998 | Bewlay et al. | |
| 5,871,174 A * | 2/1999 | Hannay | 244/35 R |
| 6,332,272 B1 * | 12/2001 | Sinnott et al. | 29/889.1 |
| 6,367,687 B1 * | 4/2002 | Reeves et al. | 228/206 |
| 6,558,119 B2 | 5/2003 | Lee et al. | |
| 6,837,417 B2 | 1/2005 | Srinivasan | |
| 6,908,288 B2 * | 6/2005 | Jackson et al. | 416/224 |
| 6,916,150 B2 | 7/2005 | Liang | |
| 7,278,829 B2 * | 10/2007 | Roedl et al. | 416/223 R |
| 7,845,908 B1 * | 12/2010 | Liang | 416/97 R |
| 7,922,455 B2 * | 4/2011 | Itzel et al. | 416/228 |
| 7,966,707 B2 * | 6/2011 | Szela et al. | 29/402.11 |
| 8,474,137 B2 * | 7/2013 | Richter et al. | 29/889.1 |
| 8,544,716 B2 * | 10/2013 | Daniels et al. | 228/119 |
| 2002/0066770 A1 * | 6/2002 | James et al. | 228/119 |
| 2003/0082053 A1 * | 5/2003 | Jackson et al. | 416/224 |
| 2005/0091848 A1 * | 5/2005 | Nenov et al. | 29/889.1 |
| 2005/0109818 A1 * | 5/2005 | Shimohata et al. | 228/119 |
| 2005/0196277 A1 | 9/2005 | Wang et al. | |
| 2007/0007260 A1 * | 1/2007 | Steinhardt | 219/121.64 |
| 2007/0044306 A1 * | 3/2007 | Szela et al. | 29/889.1 |
| 2007/0258815 A1 * | 11/2007 | Liang | 416/97 R |
| 2008/0017280 A1 * | 1/2008 | Vargas et al. | 148/522 |
| 2008/0080972 A1 * | 4/2008 | Bunker | 415/174.5 |
| 2008/0210347 A1 | 9/2008 | Morin et al. | |
| 2008/0317597 A1 | 12/2008 | Veltre et al. | |
| 2009/0320966 A1 * | 12/2009 | Morin | 148/527 |
| 2010/0054915 A1 * | 3/2010 | Devore et al. | 415/116 |
| 2010/0055841 A1 * | 3/2010 | Ozawa | 438/113 |
| 2010/0074755 A1 * | 3/2010 | Richter et al. | 416/223 R |
| 2010/0247324 A1 * | 9/2010 | Sato et al. | 416/241 R |
| 2011/0135483 A1 * | 6/2011 | Hunt et al. | 416/223 R |
| 2012/0000890 A1 * | 1/2012 | Ito et al. | 219/76.1 |
| 2012/0134833 A1 * | 5/2012 | Mashue | 416/204 R |
| 2013/0104397 A1 * | 5/2013 | Bunker | 29/889.1 |
| 2013/0115091 A1 * | 5/2013 | Bruck et al. | 416/223 R |
| 2013/0232749 A1 * | 9/2013 | Bruck et al. | 29/402.01 |
| 2014/0124484 A1 * | 5/2014 | Burbaum | 219/76.14 |
| 2014/0259668 A1 * | 9/2014 | Henderson et al. | 29/889.1 |

* cited by examiner

METHOD OF PROVIDING A TURBINE BLADE TIP REPAIR

FIELD OF THE INVENTION

This invention relates in general to blades for turbine engines and, more particularly, to the repair of the tip portion of turbine blades.

BACKGROUND OF THE INVENTION

A conventional gas turbine engine includes multiple rows of compressor blades, multiple rows of rotating turbine blades and a rotating shaft. The turbine blades are designed to convert the hot working gas of the gas turbine engine into rotational energy of the shaft within a turbine section of the engine. Each turbine blade comprises a radially extending outer wall, defining an airfoil shape, and a blade tip. The turbine blades are typically formed of a superalloy material, such as a nickel-based superalloy material. An internal cavity is formed by the outer wall and has a radially outer end that is closed by a tip cap that is typically surrounded by a squealer structure. A cooling fluid is channeled through the internal cavity to cool the outer wall and blade tip.

During normal operation of the gas turbine engine, thermal and mechanical stresses in the turbine blades may result in the formation of defects, such as cracks, in the material of the blades. Gas turbine components, and in particular the turbine blades, are routinely serviced and exchanged when necessary. In order to extend the operational life of the components, whenever possible they are refurbished, after which they may be reused in a gas turbine. Such refurbishment of a turbine blade may, for example, involve replacement of the tip cap and reformation of the squealer structure, such as by build-up welding at the blade tip.

SUMMARY OF THE INVENTION

In accordance with aspects of the invention, a method of repairing a turbine blade is provided, the turbine blade including a radially extending outer wall defining an internal cavity width and a blade tip. The method comprises removing at least a portion of the blade tip to form a repair surface, providing a tip cap having a radially outer side with an outer width less than the internal cavity width and a radially inner side with an inner width substantially equal to or greater than the internal cavity width, positioning the tip cap at the repair surface such that the radially outer side does not overlap the outer wall, welding the tip cap to the repair surface, and forming a cap peripheral portion by welding.

Further aspects of the invention include that the method may further comprise the welding of the tip cap comprising welding a joint between the tip cap and the repair surface with a material having a higher ductility than a ductility of the cap peripheral portion. The method may further include forming a replacement squealer portion on the cap peripheral portion by welding, wherein the replacement squealer portion comprises a material different than a material used in the forming of the cap replacement portion by welding. The tip cap may comprise a radially outer side surface, a radially inner side surface, a pressure side surface, and a suction side surface, wherein the radially outer side surface and the radially inner side surface may be substantially parallel and the pressure side surface and the suction side surface may be substantially non-parallel extending in a radial direction.

The tip cap may additionally comprise a radially outer side surface, a radially inner side surface, and a plurality of pressure side surfaces and suction side surfaces. One of the pressure side surfaces may be located adjacent to the repair surface and one of the suction side surfaces may be located adjacent to the repair surface, and the pressure and suction side surfaces located adjacent to the repair surface may be substantially non-parallel relative to each other, extending in a radial direction. The tip cap may have a top hat cross section including a radially inner peripheral portion in overlapping relation to the repair surface, and a radially outer peripheral portion in non-overlapping relation to the repair surface. Welding the tip cap may comprise welding a joint between the tip cap and the repair surface with a filler material having a higher ductility than a ductility of the cap peripheral portion, and the filler material may generally extend along the pressure and suction side surfaces a radial distance that is no greater than a radial extent of the radially inner peripheral portion.

In accordance with a further aspect of the invention, a method of repairing a turbine blade is provided, the turbine blade including a radially extending outer wall and a blade tip. The method comprises removing at least a portion of the blade tip to form a repair surface, providing a tip cap having a periphery comprising overlapping sections and non-overlapping sections, positioning the tip cap on the repair surface such that the tip cap overlaps the outer wall at the overlapping sections and the tip cap does not overlap the outer wall at the non-overlapping sections, welding the tip cap to the repair surface, and forming a cap peripheral portion by welding.

In accordance with further aspects of the invention, the overlapping and non-overlapping sections may comprise alternating sections located around the periphery of the tip cap. The overlapping and non-overlapping sections may define a serrated edge around the periphery of the tip cap. Welding the tip cap may comprise welding a joint between the tip cap and the repair surface with a material having a higher ductility than a ductility of the cap peripheral portion. The method may further include forming a replacement squealer portion on the cap peripheral portion by welding, wherein the replacement squealer portion comprises a material different than a material used in the forming a cap replacement portion by welding.

In accordance with yet another aspect of the invention, a method of repairing a turbine blade is provided, the turbine blade defining an airfoil shape and having a blade tip. The method comprises removing at least a portion of the blade tip to form a repair surface, providing a tip cap having a periphery configured with a shape generally matching the airfoil shape, the periphery including protruding portions extending in a direction generally perpendicular to a radial direction of the turbine blade, positioning the tip cap on the repair surface such that at least a portion of the tip cap overlaps the outer wall, welding the tip cap to the repair surface, and forming a cap peripheral portion by welding.

Further aspects of the invention include providing a tip cap that may comprise a radially outer side surface, a radially inner side surface, a pressure side surface, and a suction side surface, wherein the radially outer side surface and the radially inner side surface are substantially parallel and the protruding portions extend from the radially outer side surface to the radially inner side surface. The protruding portions may define an undulating surface of the periphery. The undulating surface of the periphery may comprise overlapping sections and non-overlapping sections, and positioning the tip cap on the repair surface may comprise positioning the tip cap such that the periphery overlaps the outer wall at the overlapping sections and the tip cap does not overlap the outer wall at the non-overlapping sections. Welding the tip cap may comprise welding a joint between the tip cap and the repair surface with a material having a higher ductility than a ductility of the cap peripheral portion. The method may further include forming a replacement squealer portion on the cap peripheral portion by welding; wherein the replacement squealer portion comprises a material different than a material used in forming a cap peripheral portion by welding.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
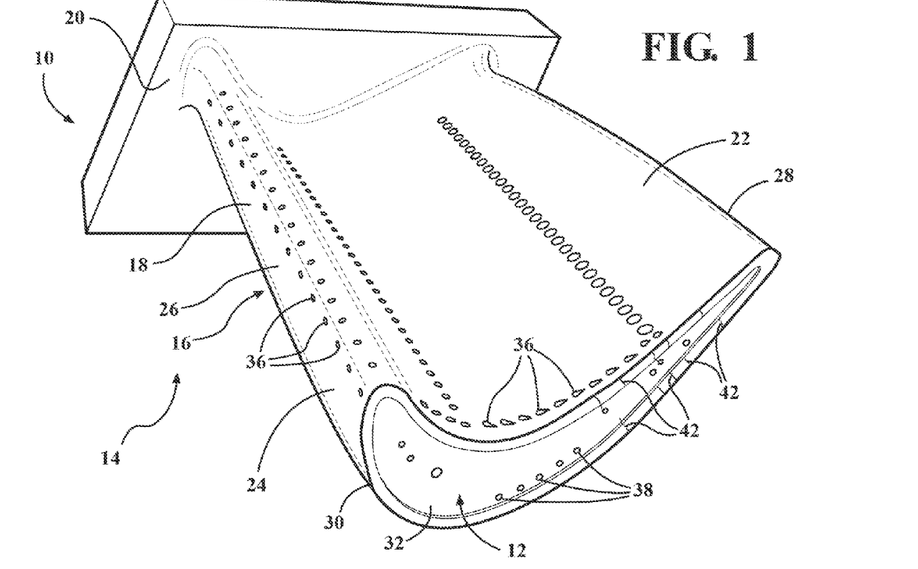
FIG. 1 is a perspective view of a prior art turbine blade having cracks formed in the blade tip.
Figure 2A:
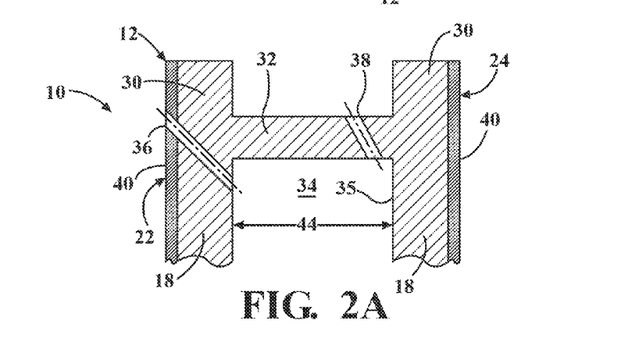
FIGS. 2A-2G are cross-sectional views illustrating a replacement turbine blade tip and steps of the blade tip repair method according to aspects of the present invention.

Reference is now made to FIG. 1 which shows a turbine blade 10 in a gas turbine engine (not shown), wherein the blade 10 includes a damaged blade tip 12, such as may be identified during a routine maintenance inspection of the engine. The turbine blade 10 is one of a plurality of turbine blades 14 that are circumferentially aligned in the gas turbine engine. The turbine blade 10 comprises an airfoil 16 extending radially outwardly from a mounting location such as a rotor disk of a rotor assembly (not shown). The airfoil 16 includes an airfoil outer wall 18 extending in a radial direction from a blade platform 20. The outer wall 18 of the airfoil 16 is exposed to a high temperature working gas of the gas turbine engine and comprises a pressure side wall 22 and an oppositely facing suction side wall 24. The pressure and suction side walls 22, 24 are joined together at chordally spaced apart leading and trailing edges 26, 28 of the airfoil 16. The blade tip 12 of the turbine blade 10 is located at a radially outer end of the outer wall 18, distal from the platform 20. The blade tip 12 includes a squealer portion 30 defining an outward extension of the airfoil outer wall 18. The blade tip 12 further comprises a tip cap 32 that is recessed from a radially outer end of the squealer portion 30, as shown in FIGS. 1 and 2A. The tip cap 32 defines a closure over an opening formed at a radially outer end of the airfoil outer wall 18 to define a closed internal cavity 34 at the blade tip 12, as shown in FIGS. 2A and 2C-G.

During operation of the gas turbine engine, cooling air circulates through the internal cavity 34 in order to cool the outer wall 18 and blade tip 12 of the turbine blade 10. Portions of the cooling air may be distributed from the internal cavity 34 through film cooling holes 36 in the outer wall 18, and through convective cooling holes 38 extending through the tip cap 32. Additionally, the turbine blade 10 may comprise a thermal barrier coating 40 on the outer surface of the airfoil outer wall 18 and squealer portion 30, as shown in FIG. 2A.

Referring again to FIG. 1, thermally and mechanically induced stresses, such as may be present during normal operation of the gas turbine engine, may result in damage to the squealer portion 30 and tip cap 32 of the turbine blade 10 in the form of cracks 42 at the blade tip 12. A turbine blade 10 exhibiting such cracks, such as may be observed during a routine inspection of the engine, is typically removed from the engine and repaired or refurbished for reinstallation in an engine. In accordance with aspects of the present invention, a method of repairing a turbine blade is described, including providing a durable tip cap structure that limits or reduces stress cracking in the tip cap, whereby the service life of the blade may be extended.

Referring to FIGS. 2A-2G, specific aspects of the present invention will be described. FIG. 2A depicts a turbine blade representative of a turbine blade requiring a blade tip repair, such as the turbine blade 10 shown in FIG. 1, and may be formed as a cast component comprising a superalloy material such as, for example, IN-738. Although the present invention is not necessarily limited to the particular component materials referenced herein.

Figure 2B:
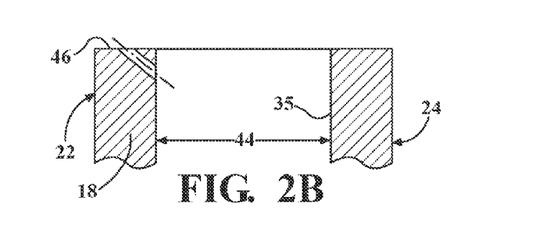

The method according to aspects of the present invention comprises removing at least a portion of the blade tip 12 to form a repair surface 46, as shown in FIG. 2B. The removal of the blade tip 12 may be accomplished by any known process such as, for example, grinding off the damaged squealer portion 30 and tip cap 32 to form a repair surface 46 comprising an outer edge of the outer wall 18. The location of the repair surface 46 may then be over-age heat treated to prepare it for a subsequent welding operation.

Figure 2C:
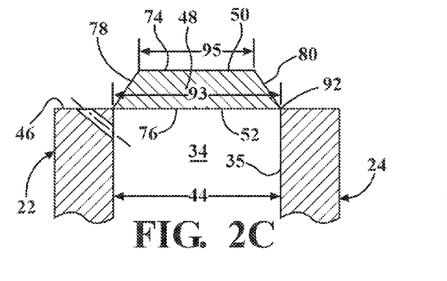

Following preparation of the repair surface 46, a replacement tip cap 48 is positioned over the internal cavity 34, as shown in FIG. 2C. In accordance with the present aspects of the invention, the replacement cap 48 has a radially outer side 50 comprising a planar outer surface 74, and an opposing radially inner side 52 comprising a planar inner surface 76 that is oriented generally parallel to the outer surface 74, wherein the radially inner surface 76 is located generally coplanar with the repair surface 46.

Figure 7:
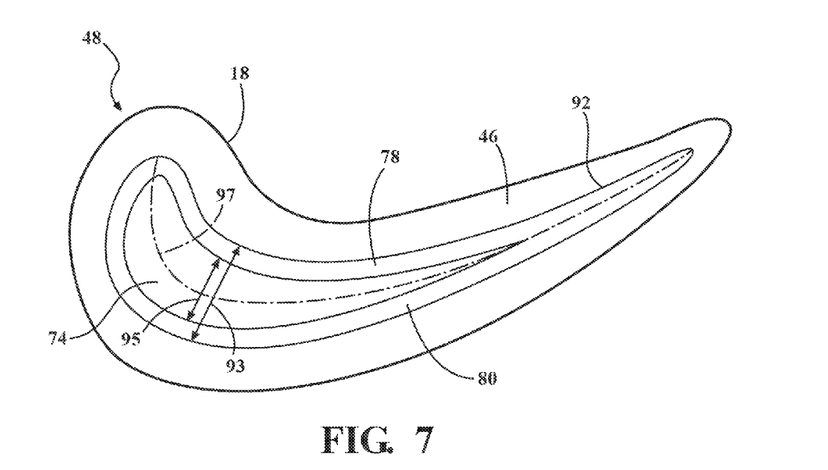
FIG. 7 is a plan view of a replacement tip cap corresponding to the replacement turbine blade tip shown in FIG. 2G, and shown in position on an outer wall of a turbine blade prior to attachment.

The replacement tip cap 48 defines a tip cap perimeter comprising an inner side perimeter 92 (FIG. 7) that is configured to generally correspond to an inner perimeter 35 of the internal cavity 34. In particular, the perimeter 92 of the replacement tip cap 48 may have an airfoil shape configured to generally match the airfoil shaped opening defined by the internal cavity 34, wherein a width 93 of the inner side 52 of the tip cap 48, i.e., a dimension perpendicular to a chordal line 97, at any given location is equal to or greater than a width 44 (FIG. 1) of the internal cavity 34 at a corresponding chordal location along the internal cavity 34. Any overlap of the tip cap perimeter 92 over the repair surface 46 may extend less than 40% of the width of the outer wall 18. However, as is described further below, an aspect of the present invention provides a weld bead filler that is configured to reduce stress risers, and may permit a greater than 40% overlap without creating unacceptable stresses at the junction between the tip cap 48 and the repair surface 46. For example, it is believed that the present weld procedure provides a stress reduction of about 45% at the junction, permitting a reduced amount of build-up weld material for the peripheral portion 56 to be used while providing sufficient structural integrity.

Further, the radially outer side 50 of the tip cap 48 defines a width 95 (FIG. 7) at any given location that is less than the inner side width 93 and less than the internal cavity width 44, such that the radially outer side 50 does not overlap the outer wall 18. That is, a radially extending line passing through a location on the radially outer side 50 of the tip cap 48 would not intersect the repair surface 46 of the outer wall 18. Hence, a pressure side surface 78 of the tip cap 48 extending between the outer and inner sides 50, 52 and a suction side surface 80 of the tip cap 48 extending between the outer and inner sides 50, 52 comprise non-parallel sides of the tip cap 48 (FIG. 2C), tapering or angled inwardly toward each other extending in a radially outward direction.

The limited overlap of the tip cap 48 over the outer wall 18, as well as the tapered or reduced material thickness above the inner side perimeter 92, provides a limited stress inducing influence from the tip cap 48 to the outer wall 18. In particular, the limited overlap between the inner side 52 and the repair surface 46 with an associated limited or reduced stress contact area between these two components, as well as the tapered edge at the pressure and suction side surfaces 78, 80, providing a wider welding joint area in the perimeter contacting area of the tip cap 48, avoids or limits a stress riser that may normally be associated with the joint between the tip cap 48 and the outer wall 18, as is described further below.

The replacement tip cap 48 is preferably comprised of a material that is compatible with the material of the outer wall 18, and in the present example may comprise IN-738. Also, as is described further below, a filler material and build-up weld material may be provided for attachment of the tip cap 48 to the repair surface 46 of the outer wall 18 in a manner that minimizes or reduces stresses that may cause cracking in the region of a weld joint 54 formed between these components.

Figure 2D:
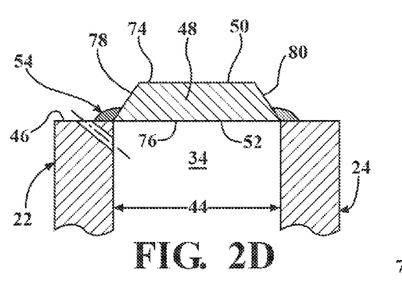

As is illustrated in FIG. 2D, the weld joint 54 at the connection between the tip cap 48 and repair surface 46 of the outer wall 18 extends around the periphery 92, and is preferably formed by a relatively ductile filler material having a low modulus of elasticity. In accordance with an aspect of the invention, the weld joint 54 may be of a generally semicircular configuration, as seen in cross-section in FIG. 2D. That is, an outer surface of the weld bead or weld joint 54 at the notch between the tip cap 48 and the repair surface 46 is formed with a specific configuration defining an outward curve, i.e., a semi-circular shape. The semi-circular cross-section of the weld joint 54, i.e., of the weld bead, allows a greater overlap of the tip cap 48 over the repair surface 46 by reducing stress risers at the notch between the tip cap 48 and repair surface 46. For example, as is further described with regard to particular materials below, the semi-circular configuration of the weld joint 54 and associated reduction of stress risers may permit a greater overlap of the tip cap 48, with a corresponding reduction of structural build-up weld material required to form the peripheral portion 56. In the present exemplary embodiment, the filler material is preferably a low modulus material comprising INCONEL 625 (INCONEL is a trademark of Inco Alloys International, Inc.), a nickel-base alloy that is hereinafter referred to as IN-625, or HASTELLOY W (HASTELLOY is a trademark of Haynes International, Inc.), a nickel-base alloy, and the weld joint may be formed in an ambient welding operation. Materials such as these are preferable because they possess a very low modulus and reduce the stress and the possibility of any resultant cracking occurring at the weld location during normal operation of the engine. In particular, low modulus weld filler materials generally require a lower heat input to form the weld joint 54, with a resulting reduced heating of the underlying material, i.e., the repair surface 46 of the outer wall 18 and the tip cap 48. This reduction in heating of the underlying material reduces the propensity for the outer wall 18 and tip cap 48 to crack in the region of the weld joint 54 during the welding and repair process.

Further, the tip cap configuration described above, having a reduced material thickness above or proceeding outwardly from the inner side perimeter 92, provides improved weld penetration in the region of the weld joint 54. The improved weld penetration facilitates the formation of a secure weld having an increased resistance to cracking or separation at the weld joint 54. Since the formation of a separation or notch at the interface between the inner side 52 and the repair surface can create increased stress locations in the joint, reducing the likelihood of these notches can improve the durability of the weld joint 54 to prevent the tip cap 48 from becoming liberated from the outer wall 18 during operation of the blade 10 in an engine.

Figure 2E:
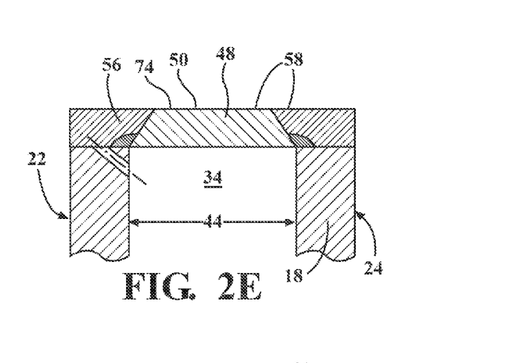

As is illustrated in FIG. 2E, a structural build-up weld is formed around the side surfaces 78, 80 on the repair surface 46 to define a cap peripheral portion 56 extending around the tip cap 48. The cap peripheral portion 56 is preferably formed of a structural weld material matching that of the outer wall 18, as well as matching the material of the tip cap 48 and, in the present exemplary embodiment, comprises INCONEL 738, a nickel-base alloy that is hereinafter referred to as IN-738. The build-up weld material preferably includes material characteristics comprising a ductility that reduces the cracking propensity of the peripheral portion 56 while still providing the necessary strength to provide the structural function of the peripheral portion 56. Additionally, the build-up weld material preferably has a mean co-efficient of thermal expansion that is within a range similar to that of materials such as IN-625 and CM-247 (available from Cannon-Muskegon Corporation), a nickel-base alloy. For example, the mean co-efficient of thermal expansion for the filler material may be within a range between about $13.42 \times 10^{(-6)}$ m/m-° C. (CM-247) and $15.1 \times 10^{(-6)}$ m/m-° C. (IN-625).

The amount of overlap between the tip cap 48 and the repair surface may vary depending upon the particular strength of the material used as the build-up weld material, which is selected with reference to the material of the outer wall 18. For example, if the build-up weld material is IN-738, a reduced amount of overlap may be provided, i.e., less than 45%, to permit a sufficient amount of structural build-up weld material to be applied. Alternatively, if a higher strength build-up weld material is applied, such as CM-247, a lesser amount of the build-up weld material will be required and the overlap between the tip cap 48 and repair surface 46 may be higher, such as a 50% overlap.

The build-up weld may be applied to the repair surface 46 and the angled side surfaces 78, 80 to a height extending slightly beyond the outer surface 74 of the tip cap 48, followed by a grinding operation to form the cap peripheral portion 56 coplanar with the outer surface 74 of the tip cap 48, thereby defining a generally planar outer cap surface 58 extending across the build-up weld material and the tip cap 48, as shown in FIG. 2E.

Figure 2F:
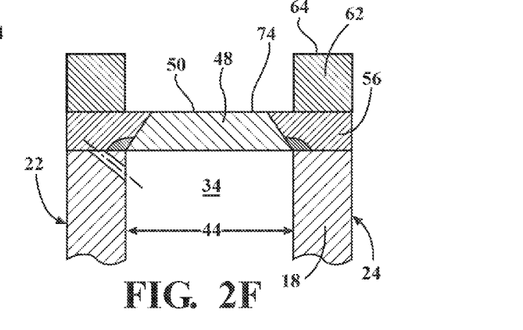

A replacement squealer portion 62 is then formed on the outer cap surface 58 of the cap peripheral portion 56 by structural build-up welding, as is illustrated in FIG. 2F. In the present embodiment, the replacement squealer portion 62 comprises a different material than that of the tip cap 48 and cap peripheral portion 56. For example, the material of the squealer portion 62 may be relatively more ductile, such as IN-625. Following the build-up welding for the squealer portion 62, a grinding and/or EDM machining operation may be performed to form a radially outer surface 64 and to establish the final contour for the squealer portion 62, and resulting in the final configuration for the replacement blade tip 66. Finally, as may be seen in FIG. 2G, a thermal barrier coating (TBC) 68 may be applied to an outer surface 70 of the replacement blade tip 66, and film cooling holes 72 and convection cooling holes 73 may be drilled in order to provide a flow of cooling air to the exterior of the replacement blade tip 66.

Figure 2G:
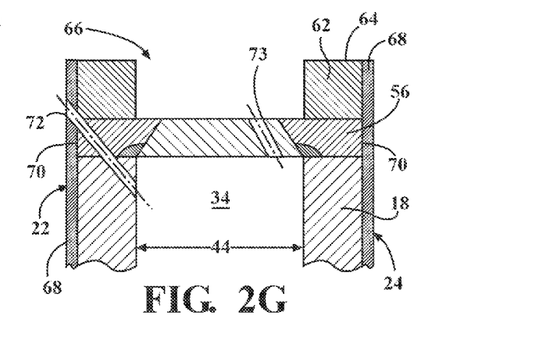
Figure 3:
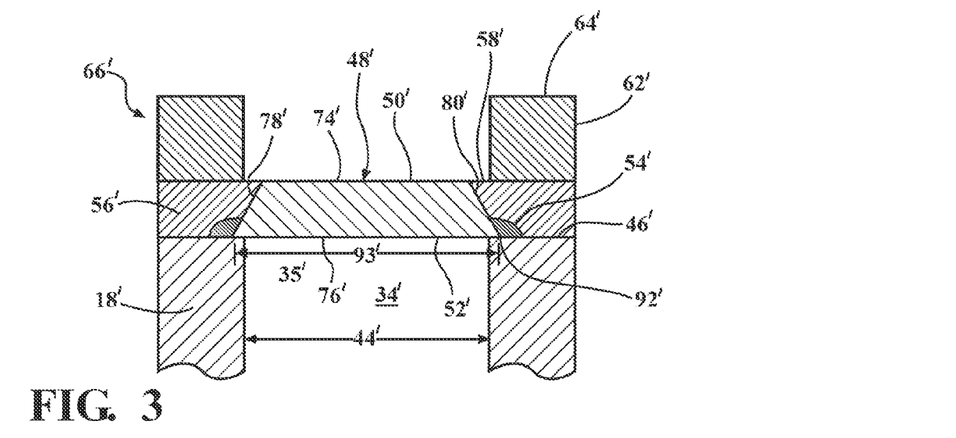
FIG. 3 is a cross-sectional view of a replacement turbine blade tip according to further aspects of the present invention.

FIG. 3 illustrates a tip cap 48', which is a variation of the tip cap 50 wherein elements corresponding to those described for the blade tip 66 of FIG. 2G are labeled with the same reference numerals primed, and in which the repair method and materials are substantially the same as described for the blade tip 66. The tip cap 48' includes a perimeter 92' defining an inner side width 93' that is greater than the internal cavity width 44' and overlaps the repair surface 46' of the outer wall 18' by less than 40%. In particular, the tip cap 48' illustrates providing an inner side 52' for the tip cap 48' that overlaps the repair surface 46' by about 15%. All aspects of the blade tip 66' formed by the tip cap 48', including the materials, are substantially the same as described above for the blade tip 66 formed by the cap 48.

Figure 4:
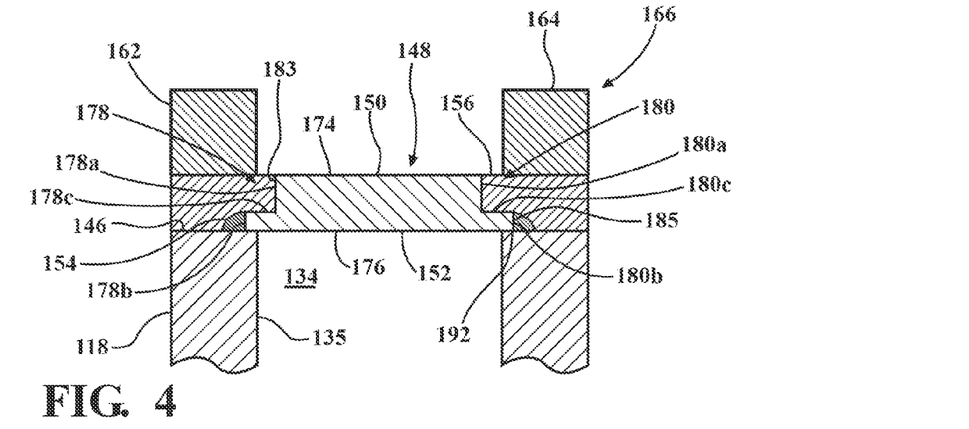
FIG. 4 is a cross-sectional view of a replacement turbine blade tip according to still further aspects of the present invention.

FIG. 4 illustrates an alternative aspect of the invention comprising a tip cap 148, and in which elements corresponding to those described for the blade tip 66 of FIG. 2G are labeled with the same reference numerals increased by 100, and in which the repair method and materials are substantially the same as described for the blade tip 66. The tip cap 148 is configured such that it has a stepped or top hat cross-section. In particular, the pressure side surface 178 and suction side surface 180 are formed with a plurality of side surfaces to define a stepped transition between the radially outer side 150 and the radially inner side 152. The pressure side surface 178 includes first and second radially extending pressure side surfaces 178a, 178b connected by a radially outwardly facing surface 178c, and the suction side surface 180 includes first and second radially extending suction side surfaces 180a, 180b connected by a radially outwardly facing surface 180c. The pressure side surfaces 178a, 178b and suction side surfaces 180a, 180b are generally perpendicular to the repair surface 146, and are generally parallel to each other.

The first pressure and suction side surfaces 178a, 180a define a radially outer perimeter portion 183 and the second pressure and suction side surfaces 178b, 180b define a radially inner perimeter portion 185. As illustrated in FIG. 4, the radially inner perimeter portion 185 is in overlapping relation to the repair surface 146 of the outer wall 118, and the radially outer perimeter portion 183 is in non-overlapping relation to the repair surface 146. As described with reference to forming the blade tip 66, the overlapping or non-overlapping relationship of the tip cap 148 relative to the repair surface is determined with reference to a radially extending line passing through a location on the tip cap 148 and radially inwardly toward the repair surface or the internal cavity 134.

The tip cap 148 is attached to the repair surface 146 by a ductile filler material forming a weld joint 154 around the radially inner perimeter 185. The ductile filler material may comprise IN-625 or HASTELLOY W, as described above with regard the method of forming the blade tip 66. The filler material of the weld joint 154 generally extends along the second pressure and suction side surfaces 178b, 180b a radial extent that is about equal to, or no greater than, about the radial extent of the inner perimeter portion 185 defined by the second pressure and suction sides 178b, 180b. The inner perimeter portion 185 provides an area of reduced material that facilitates weld penetration for formation of the weld joint 154. Further, the first pressure and suction side surfaces 178a, 180a and respective outwardly facing surfaces 178c, 180c define a recessed area of the tip cap 148 for receiving the build-up weld material of the cap peripheral portion 156 to facilitate retention of the tip cap 148 to the outer wall 118. As described above with regard to the blade tip 66, the cap peripheral portion 156 may be formed of IN-738, and a squealer portion 162 may be formed of a more ductile material, such as IN-625.

Figure 5:
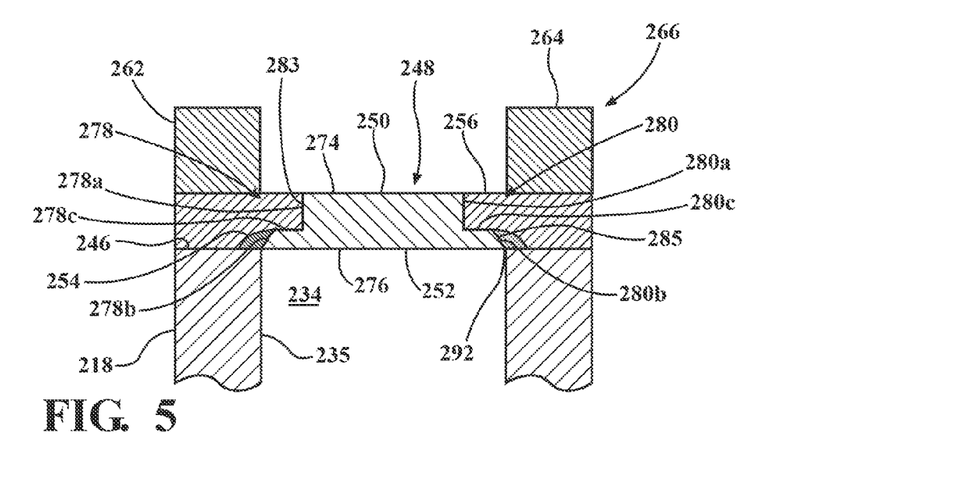
FIG. 5 is a cross-sectional view of a replacement turbine blade tip according to still further aspects of the present invention.

FIG. 5 illustrates an alternative aspect of the invention comprising a tip cap 248, and in which elements corresponding to those described for the blade tip 66 of FIG. 2G are labeled with the same reference numerals increased by 200, and in which the repair method and materials are substantially the same as described for the blade tip 66. The tip cap 248 of FIG. 5 is substantially similar to the tip cap 148 of FIG. 4, with the exception that the tip cap 248 includes second pressure and suction sides 278b, 280b that are non-parallel. In particular, the second pressure and suction sides 278b, 280b taper or angle inwardly toward each other extending in a radially outward direction, additionally reducing the material in the area of the radially inner perimeter portion 285. Further, a radially inner side perimeter 292 may be configured to generally correspond to an inner perimeter 235 of the internal cavity 234 in a manner similar to that described above for the inner perimeter 92 of the blade tip 66. However, it should be understood that at least a portion of the inner side perimeter 292 may overlap the repair surface 246.

As in the configuration described with reference to FIG. 4, the filler material forming the weld joint 254 comprises a ductile material, and preferably extends a radial distance about equal to, or no greater than, about the radial extent of the inner perimeter portion 285 defined by the second pressure and suction sides 278b, 280b. The reduced material thickness provided at the radially inner perimeter portion 285 provides improved weld penetration in the region of the weld joint 254. As described above, the improved weld penetration facilitates the formation of a secure weld having increased resistance to cracking or separation at the weld joint 254.

Figure 6:
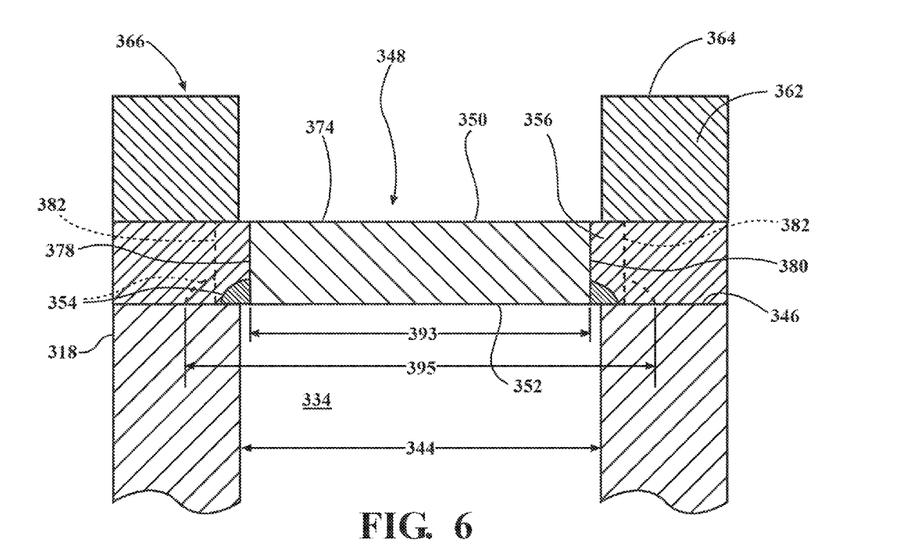
FIG. 6 is a cross-sectional view of a replacement turbine blade tip according to yet further aspects of the present invention.
Figure 8:
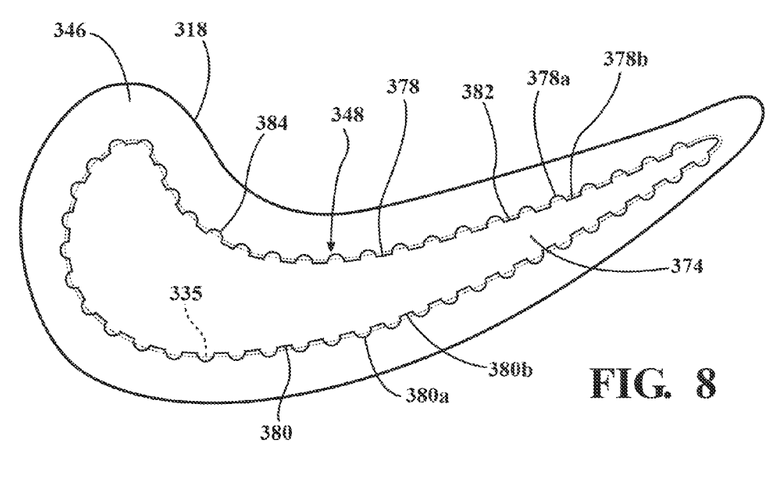
FIG. 8 is a plan view of a replacement tip cap corresponding to the replacement turbine blade tip shown in FIG. 6, and shown in position on an outer wall of a turbine blade prior to attachment.

Referring to FIGS. 6 and 8, an alternative aspect of the invention is illustrated comprising a tip cap 348, and in which elements corresponding to those described for the blade tip 66 of FIG. 2G are labeled with the same reference numerals increased by 300, and in which the repair method and materials are substantially the same as described with reference to FIGS. 2B-2G for providing the blade tip 66 to the turbine blade 10.

The tip cap 348 comprises a pressure side surface 378 and a suction side surface 380 defining a periphery 382 of the tip cap 348. In accordance with aspects of the invention, the periphery 382 includes protruding portions 384 extending outwardly from the pressure and suction side surfaces 378, 380 in a direction generally perpendicular to the radial direction of the outer wall 318 of the turbine blade. Further, the protruding portions 384 have a length dimension that extends in the radial direction from the radially outer side 350 to the radial inner side 352 of the tip cap 348. As illustrated in FIG. 8, the protruding portions 384 define a generally semi-circular cross-sectional shape, and may comprise rib-like features extending from the pressure and suction side surfaces 378, 380. However, other cross-sectional configurations for the protruding portions 384 may be provided.

Referring to FIG. 8, the tip cap 348 is shown in position over the internal cavity 334, and alternating sections of the periphery 382 are in overlapping and non-overlapping relation on the repair surface 346. Specifically, the protruding portions 384 and the pressure and suction side surfaces 378, 380 form an undulating or serrated surface, and define respective pressure side overlapping and non-overlapping sections 378a, 378b and respective suction side overlapping and non-overlapping sections 380a, 380b. For example, an inner side dimension 395 (FIG. 6) measured between two protruding portions 384 on opposing sides of the tip cap 348 may typically be greater than the width 344 of the internal perimeter 335 of the internal cavity 334, and an inner side dimension 393 between the pressure and suction side surfaces 378, 380 may typically be equal to or less than the width 344 of the internal cavity 334 at a corresponding location on the outer wall 318.

The undulating periphery 382 of the tip cap 348 provides a configuration that permits the tip cap 348 to be formed with a greater tolerance relative to the internal perimeter 335 of the internal cavity 334 wherein non-overlapping sections 378a, 378b of the tip cap 348 may not overlap the repair surface 346 while providing sufficient engagement locations with the repair surface 346 around the periphery 382 of the tip cap 348. Hence, minimized or reduced contact area between the tip cap 348 and repair surface 346, with an associated reduction in stress points, may be provided. Further, the undulating surface of the periphery 382 may provide additional surface area for engagement with the filler material forming the weld joint 354 to provide an improved retention of the tip cap 348. In addition, it may be understood that the entire periphery 382 may be formed to overlap the repair surface 346.

Figure 9:
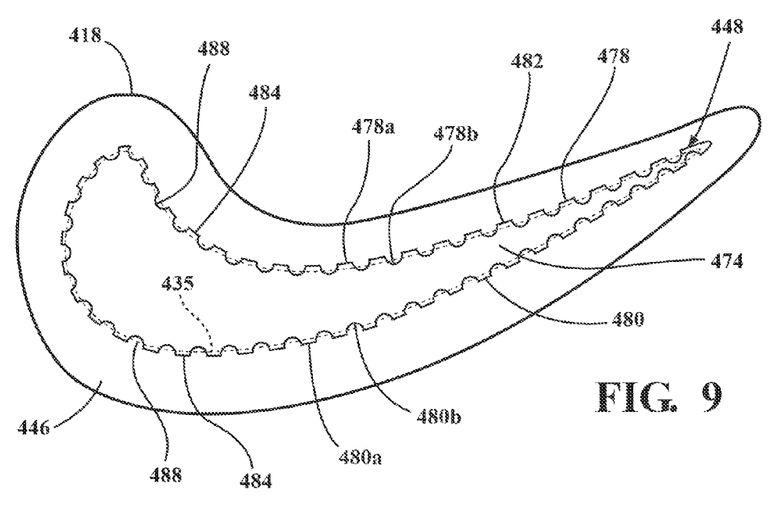
FIG. 9 is a plan view of a replacement tip cap that is a variation of the replacement tip cap shown in FIG. 8, and shown in position on an outer wall of a turbine blade prior to attachment.

Referring to FIG. 9, a tip cap 448 is illustrated comprising a variation of the tip cap 348 described with reference to FIGS. 6 and 8. The tip cap 448 comprises a pressure side surface 478 and a suction side surface 480 defining a periphery 482 of the tip cap 448. In accordance with aspects of the invention, the periphery 482 includes alternating overlapping and non-overlapping sections to form an undulating or serrated surface. In particular, the periphery 482 includes respective pressure side overlapping and non-overlapping sections 478a, 478b and respective suction side overlapping and non-overlapping sections 480a, 480b, wherein the overlapping sections 478a, 480a define protruding portions of the periphery 482.

In accordance with aspects illustrated in FIG. 9, the alternating overlapping and non-overlapping sections 478a, 480a and 478b, 480b may be defined by generally semi-circular grooves 488 extending into the pressure and suction side surfaces 478, 480. The grooves 488 have a length dimension that extends in the radial direction from the radially outer side to the radial inner side of the tip cap 448. Hence, the pressure and suction side surfaces 478, 480 define protruding portions of the periphery 484, extending outwardly in a direction generally perpendicular to the radial direction of the outer wall 418 of the turbine blade. It should be understood that, although the grooves 488 are illustrated with a semi-circular shape, other cross-sectional configurations for the grooves 488 may be provided.

The tip cap 448 may extend past the internal perimeter 435 of the internal blade cavity to overlap the repair surface 446 in a manner similar to that described above for the tip cap 348 with reference to FIG. 6. As described above for the tip cap 348, the undulating periphery 482 of the tip cap 448 provides a configuration that permits the tip cap 448 to be formed with a greater tolerance relative to the internal perimeter 435 of the internal blade cavity wherein non-overlapping portions of the tip cap 448 may not overlap the repair surface 446 while providing sufficient engagement locations with the repair surface 446 at the overlapping sections 478a, 480a around the periphery 482 of the tip cap 448. Also, the undulating surface of the periphery 382 may provide additional surface area for engagement with the filler material forming the weld joint to provide an improved retention of the tip cap 448.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of repairing a turbine blade having a radially extending outer wall defining an internal cavity width and a blade tip, the method comprising:
   removing at least a portion of the blade tip to form a repair surface;
   providing a tip cap having a radially outer side with an outer width less than said internal cavity width and a radially inner side with an inner width substantially equal to or greater than said internal cavity width;
   positioning said tip cap at said repair surface such that said radially outer side does not overlap said outer wall, wherein a notch is formed between a periphery of said tip cap and said repair surface;
   performing a first welding operation welding said tip cap to said repair surface, said first welding operation including forming a weld bead using a first welding material filling in said notch around the periphery of said tip cap; and
   performing a second welding operation including build-up welding to form a cap peripheral portion using a second welding material, different from said first welding material, formed over said first welding material and extending on said repair surface between said tip cap and an outer surface of said outer wall;
   wherein said first welding material forming said weld bead filling in said notch has a higher ductility than a ductility of said second welding material forming said cap peripheral portion, and wherein, following said second welding operation, said first welding material remains in said notch separating said second welding material from contact with said tip cap and said repair surface at said notch.

2. The method as set forth in claim 1, including forming a replacement squealer portion on said cap peripheral portion by welding, wherein said replacement squealer portion comprises a material different than said second welding material used for forming said cap peripheral portion.

3. The method as set forth in claim 1, wherein said providing a tip cap further comprises providing a radially outer side surface, a radially inner side surface, a pressure side surface, and a suction side surface, wherein said radially outer side surface and said radially inner side surface are substantially parallel and said pressure side surface and said suction side surface are substantially non-parallel extending in a radial direction.

4. The method as set forth in claim 1, wherein said providing a tip cap further comprises providing a radially outer side surface, a radially inner side surface, and a plurality of pressure side surfaces and suction side surfaces.

5. The method as set forth in claim 4, wherein one of said pressure side surfaces is located adjacent to said repair surface and one of said suction side surfaces is located adjacent to said repair surface, and said pressure and suction side surfaces located adjacent to said repair surface are substantially non-parallel relative to each other, extending in a radial direction.

6. The method as set forth in claim 4, wherein said tip cap has a top hat cross section including a radially inner perimeter portion in overlapping relation to said repair surface, and a radially outer perimeter portion in non-overlapping relation to said repair surface.

7. The method as set forth in claim 6, wherein:
said filler material generally extends along said pressure and suction side surfaces a radial distance that is no greater than a radial extent of said radially inner perimeter portion.

8. The method as set forth in claim 1, wherein said weld bead formed by said first welding operation is formed as an outwardly curved bead extending from a location on a side wall of said tip cap radially spaced outwardly from said repair surface to said repair surface.

9. The method as set forth in claim 1, wherein said tip cap is configured with an airfoil shape and said outer width of said tip cap is less than said inner width of said tip cap, as measured perpendicular to a chordal line at locations along the chordal line.

10. A method of repairing a turbine blade having a radially extending outer wall defining an internal cavity width and a blade tip, the method comprising:
removing at least a portion of the blade tip to form a repair surface;
providing a tip cap having a radially inner side, and the tip cap including a periphery defined at the radially inner side and comprising overlapping sections and non-overlapping sections in a radial direction of the blade, the non-overlapping sections located over the internal cavity width;
positioning said radially inner side of said tip cap on said repair surface such that said radially inner side of said tip cap overlaps said outer wall and engages said repair surface at said overlapping sections and said radially inner side of said tip cap does not overlap said outer wall at said non-overlapping sections;
performing a first welding operation welding said tip cap to said repair surface at a notch formed by a junction between said tip cap and said repair surface; and
performing a second welding operation to form a cap peripheral portion extending between said tip cap and an outer surface of said outer wall.

11. The method as set forth in claim 10, wherein said overlapping and non-overlapping sections comprise alternating sections located around the periphery of said tip cap.

12. The method as set forth in claim 10, wherein said overlapping and non-overlapping sections define a serrated edge around the periphery of said tip cap.

13. The method as set forth in claim 10, wherein said welding said tip cap further comprises welding a joint between said tip cap and said repair surface with a material having a higher ductility than a ductility of said cap peripheral portion.

14. The method as set forth in claim 10, including forming a replacement squealer portion on said cap peripheral portion by welding, wherein said replacement squealer portion comprises a material different than a material used in said forming a cap peripheral portion by welding.

15. The method as set forth in claim 10, wherein:
following said second welding operation, said first welding operation fills said notch with a first welding material; and
a second welding material applied by said second welding operation is welded onto said repair surface between said first welding material and said outer surface of said outer wall.

16. A method of repairing a turbine blade defining an airfoil shape defining an internal cavity width and having a blade tip, the method comprising:
removing at least a portion of the blade tip to form a repair surface;
providing a tip cap having a radially inner side, and the tip cap including a periphery defined at the radially inner side and configured with a shape generally matching said airfoil shape, said periphery including protruding portions defining an undulating surface of said periphery at said radially inner side, the undulating surface defined by said protrusions extending in a direction generally perpendicular to a radial direction of said turbine blade;
positioning said radially inner side of said tip cap on said repair surface such that at least a portion of said radially inner side of said tip cap, including said protrusions, overlaps said outer wall and engages said repair surface;
performing a first welding operation welding said tip cap to said repair surface at a notch formed by a junction between said tip cap and said repair surface; and
performing a second welding operation to form a cap peripheral portion extending between said tip cap and an outer surface of said outer wall.

17. The method as set forth in claim 16, wherein said providing a tip cap further comprises providing a radially outer side surface, a radially inner side surface, a pressure side surface, and a suction side surface, wherein said radially outer side surface and said radially inner side surface are substantially parallel and said protruding portions extend from said radially outer side surface to said radially inner side surface.

18. The method as set forth in claim 16, wherein said undulating surface of said periphery comprise overlapping sections and non-overlapping sections in a radial direction of said blade, and said positioning said tip cap on said repair surface further comprises positioning said tip cap such that said periphery overlaps said outer wall at said overlapping sections and said tip cap does not overlap said outer wall at said non-overlapping sections.

19. The method as set forth in claim 16, wherein said welding said tip cap further comprises welding a joint between said tip cap and said repair surface with a material having a higher ductility than a ductility of said cap peripheral portion.

20. The method as set forth in claim 16, including forming a replacement squealer portion on said cap peripheral portion by welding, wherein said replacement squealer portion comprises a material different than a material used in said forming a cap peripheral portion by welding.

* * * * *